United States Patent [19]
Charpentier

[11] 3,832,429
[45] Aug. 27, 1974

[54] METHOD AND APPARATUS FOR THE PRODUCTION OF SHEET ON BLOCK OF AGGLOMERATED GRANULES OF POLYSTRYRENE

[75] Inventor: Maurice Charpentier, Rantigny, France

[73] Assignee: Saint-Gobain Idustries, Neuilly sur Seine, France

[22] Filed: Apr. 13, 1966

[21] Appl. No.: 542,367

[52] U.S. Cl.............. 264/51, 264/101, 264/109, 264/321, 264/345, 264/DIG. 19, 425/174.4, 425/329, 425/371, 425/384, 425/817 C
[51] Int. Cl............... B29c 15/00, B29d 27/00
[58] Field of Search....... 264/321, 51, 53, 109, 321, 264/345, DIG. 14; 18/4 B, 5 P; 425/174.4, 329, 371, 384, 817 C

[56] References Cited
UNITED STATES PATENTS

| | | |
|---|---|---|
| 3,129,464 | 4/1964 | Heider................... 18/5 P |
| 3,255,286 | 6/1966 | Luc-Belmont............. 264/51 |
| 3,264,381 | 8/1966 | Stevens................. 18/5 P |
| 3,359,353 | 12/1967 | Oddi................... 264/53 |
| 3,368,009 | 2/1968 | Oddi................... 264/53 |

*Primary Examiner*—Philip E. Anderson
*Attorney, Agent, or Firm*—Synnestvedt & Lechner

[57] ABSTRACT

Method and apparatus for the production or agglomerated granules or polystyrene, in sheet or block form. The expanded granules are uniformly heated under relatively slight compression by blowing air through them for a period of between 10 seconds and 3 minutes. The air is preferably at or above the softening temperature of the granules. The heated granules are then compressed under a pressure of from 0.5 to 4 metric tons/m² until their apparent volume is approximately one-half their original volume. The compressed granules are then cooled while remaining under pressure, to a temperature at which the agglomeration does not swell or re-expand. The method can be carried out by batch or by continuous procedures.

15 Claims, 9 Drawing Figures

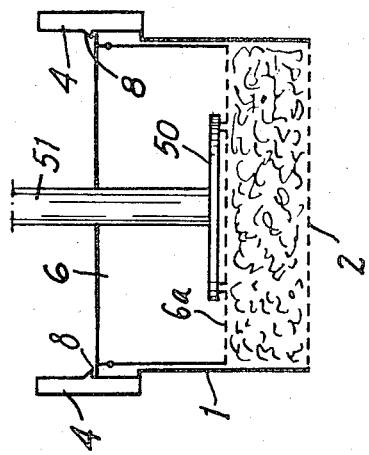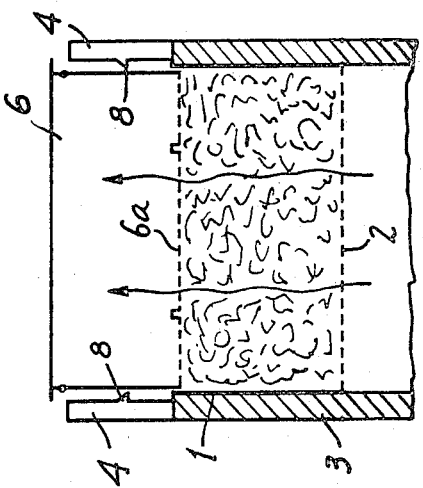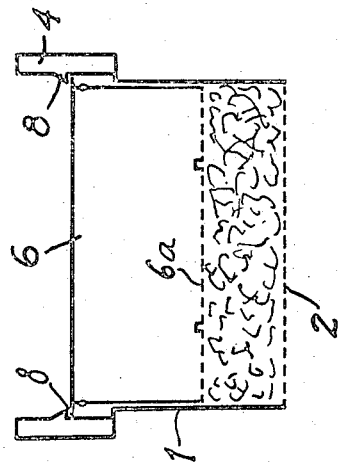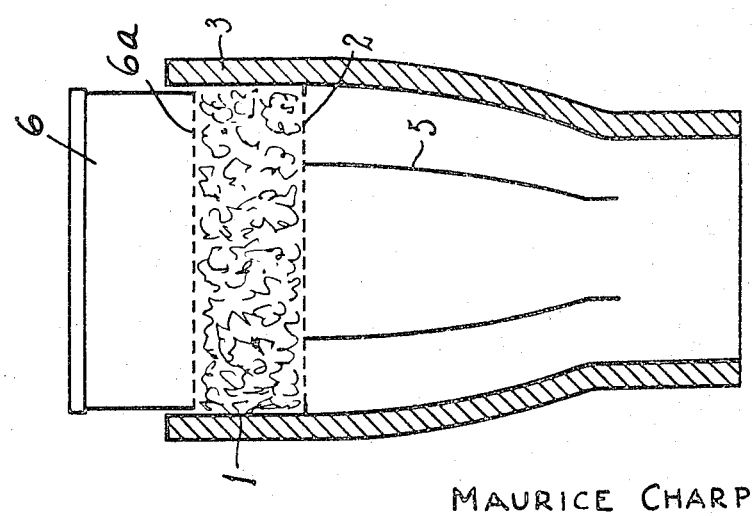

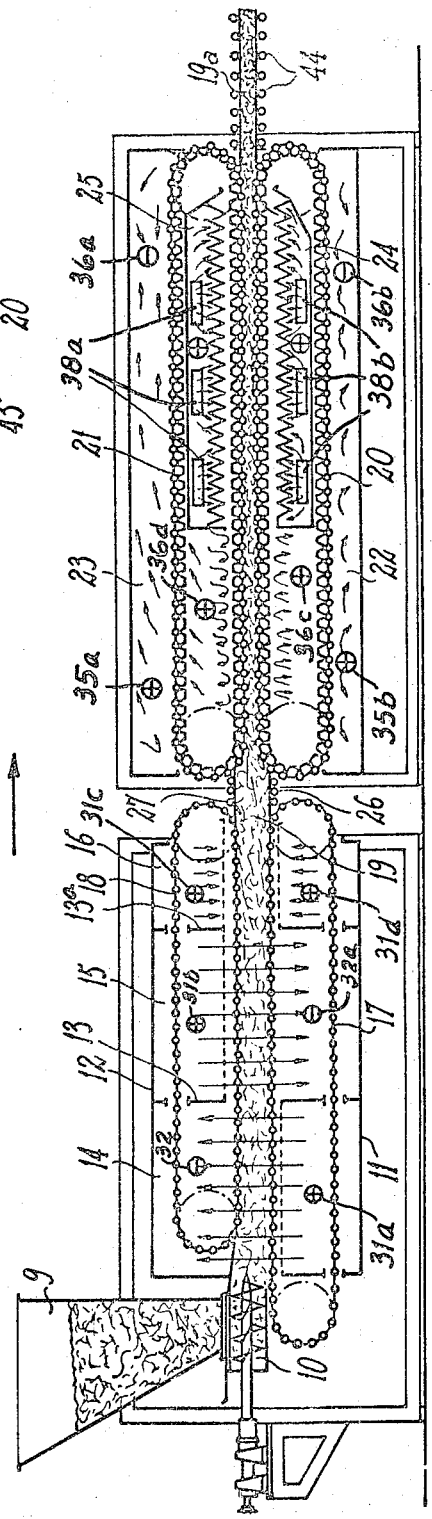
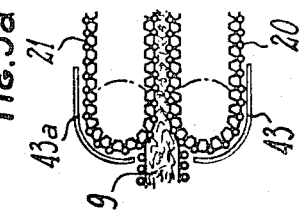
Fig. 5
Fig. 5a
Inventor
MAURICE CHARPENTIER
By Baxer and Seymour
Attorneys

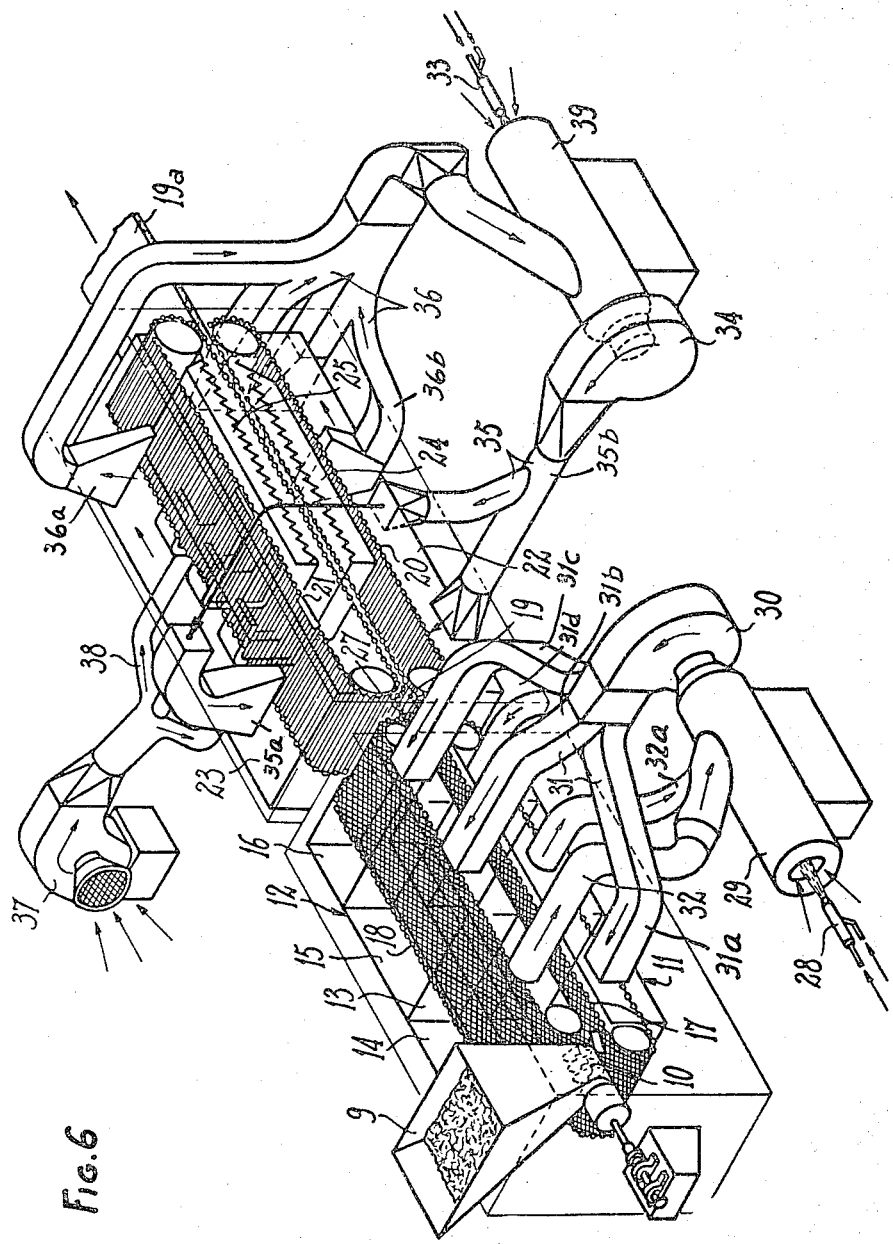

Inventor
MAURICE CHARPENTIER

METHOD AND APPARATUS FOR THE PRODUCTION OF SHEET ON BLOCK OF AGGLOMERATED GRANULES OF POLYSTRYRENE

This invention relates to the fabrication of cellular products of thermoplastic resin and, in particular, to the fabrication of such products as panels, sheets, slabs or plates, for use in thermal insulation having good mechanical strength and of low density.

In the fabrication of such cellular products, for example, polystyrene foam, it is usual to start with small granules of the material, in which a foaming or blowing agent has been incorporated. The material when heated, causes the volitization of the blowing agent and expands the granules into beads or pellets.

The prior art procedure wherein the pressure required to give the expanded beads the desired cohesive form, is created by the internal expansion of the granules at the instant of volitization of the blowing agent, does not result in a homogenous product of low density. Nevertheless, such products having a high degree of homogeneity and low density are commercially sought and are advantageous because they require a minimum amount of material per unit volume of finished product and at the same time afford excellent thermal insulation.

In accordance with the present invention, beads of material which have been previously expanded, are subsequently subjected to compression to cause them to agglomerate and cohere into the desired shape or form. In carrying out the invention the material may be beads of polystyrene expanded in the manner taught by applications serial no. 542,236 and 542,363, both filed on even date with the present application and now U.S. Pat. Nos. 3,631,133 and 3,598,769 respectively. These expanded beads are of particular interest because they have a specific gravity of the order of 5 Kg/m3, or less. They are produced by the method taught in the second of the aforesaid applications, according to which the granules are first heated in air, to a temperature of about 90° to 100°C, or above, and are next treated with steam. The expanded beads may also be produced by the method taught in the first of the aforesaid applications, wherein the granules are first expanded by steam at atmospheric pressure and then, after drying, treated with steam under pressure in an autoclave.

The method of the present invention relates to the agglomeration of the expanded pellicles or beads, in three steps. First, the beads are reheated to softening temperature. Secondly the heated beads are subjected to compression sufficient to impart the desired thickness and density to the agglomerated particles. Thirdly, the shaped material is cooled while subjected to compression sufficient to maintain the aforesaid desired thickness.

The reheating of the beads constituting the first step, as aforesaid, is desirably effected by heated air or, alternatively, by steam under pressure. During this step the beads should not be subjected to compression. However, it is permissible to subject the material to a degree of compression after it has reached a plastic or softened state, in order to reduce the thickness of the agglomerated mass by a decrease in the interstitial spaces between beads.

Utilization of heated air during the first step of the method permits operation at atmospheric pressure. This also enables an appreciable reduction, if necessary, in the inflation of the beads of material at the instant of their heating. Moreover, it is important to control the temperature very accurately during the first step, because too high a temperature causes the beads to harden, while if the temperature is too low, the material is poorly agglomerated.

The second step, wherein the material is formed into the desired shape, is effected without additional heat in maintaining the pellets at the temperature imparted to them in and during the first step. It is desirable to maintain the material at the same thickness throughout the second and third steps. The invention contemplates in particular, utilizing the same means of compression throughout these two latter steps of treatment.

As another characteristic of the invention, I have found that the apparent density, that is, the mass per unit volume occupied by the beads and the interstitial spaces therebetween, should be selected as a function of the desired final density of the product. If this apparent density is too low, the final product will be excessively porous. On the other hand, if the apparent density is too high, the resulting product will be deficient in desired mechanical properties. The most desirable apparent density is between 0.4 and 0.6, and preferably about 0.5. The method can be carried out either continuously or discontinuously, as will be subsequently explained.

Other characteristics, objects and advantages of the invention will become clear from a study of the following detailed description, in connection with the accompanying drawing.

In the drawing:

FIG. 1 illustrates a mold, partly in section, for carrying out the method in a discontinuous way, and loaded with a charge of granules;

FIG. 2 shows the mold of FIG. 1 moved to a second position for heating of the material;

FIG. 3 shows the same mold positioned in a press and with the granules therein fully compressed;

FIG. 4 shows the mold at a location where the material is cooled in the third and final step;

FIG. 5 shows in vertical longitudinal elevation, partly in section, an apparatus by which the method is carried out continuously;

FIG. 5a is a detail view of the apparatus depicted upon FIG. 5;

FIG. 6 is a perspective view of the apparatus of FIG. 5, with parts of the housing removed to more clearly illustrate details of construction;

Figure 7:
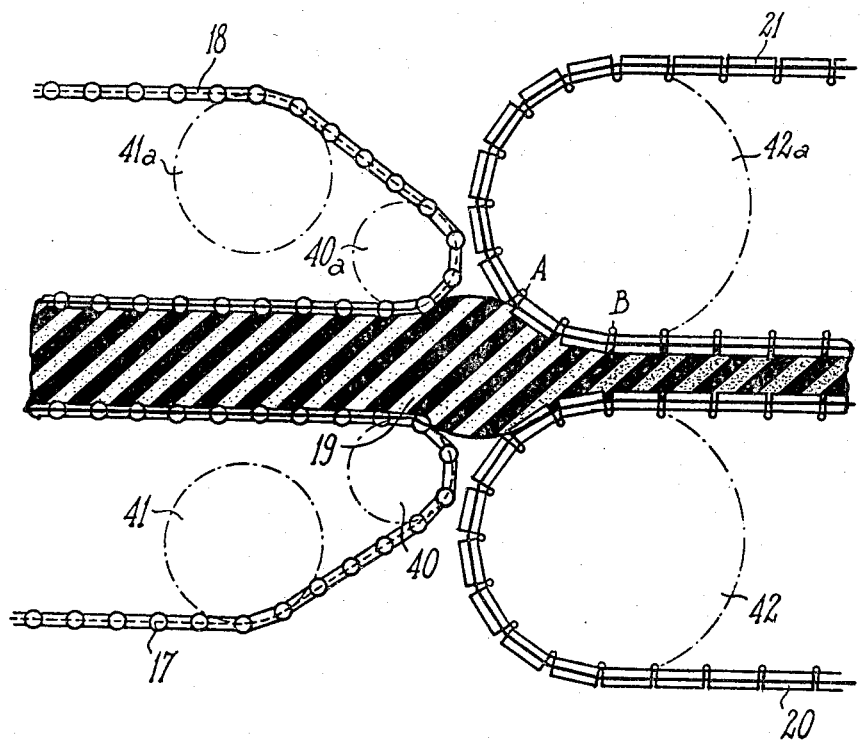
FIG. 7 shows details of construction of the apparatus at the location where the material passes from the heating zone to the compression zone.

Referring to FIG. 1, a mold 1 is provided with a perforated bottom 2 and is enclosed by heat insulating material 3. The expanded polystyrene beads of low density, are deposited into the mold and a cover 6, having a perforated bottom 6a smoothly fitting the mold, is placed over the material to form a piston by which it may be compressed. At this stage the cover exerts little or no pressure upon the beads or pellets.

Transferring attention to FIG. 2, the beads are next heated by blowing air through the mold. The heated air passes freely through the perforation in bottoms 2 and 6a. Diffusers or baffles 5, FIG. 1, positioned within the mold below its perforated bottom, guide, direct and uniformly distribute the air. This air has a temperature between about 103° and 130° C, and is blown into and through the mass of beads for a period of between 10 seconds and 3 minutes. The temperature of the air should be above the softening temperature of the beads and higher in proportion as the period of heating is short, that is, inversely proportional to the time of heating, within the temperature range given. Selection of air temperature will also depend to a certain extent upon the thermal inertia of the base of the mold through which the air is blown. For instance, using the same mold, like results are attained by heating for 3 minutes with air at 112°C., for 1 minute at 117°C., and for 12 seconds at 120° C.

As previously noted, the temperatures of the air are regulated or controlled precisely and experimentally, in accordance with results attained. If, after pressing, the beads are poorly united, the temperature is too low and should be raised. If, on the other hand, the product is hard and of poor appearance, the temperature is too high and should be lowered.

Having completed the first step, the reheating of the material, the mold and its cover are transferred to a location on a press, where bottom 6a is engaged by the foot 50 of press plunger 51, and the material is compressed until its volume is approximately one-half of the original, as is clearly shown upon FIG. 3. This requires on the average, a pressure of from 0.5 to 4 metric tons/m² of mold area, and depends to a certain extent upon the temperature attained or used in the first step, and the desired specific gravity of the final product. The rate of descent of cover 6 should be relatively rapid at first and slower as pressing nears completion. Duration of compression is of the order of 5 seconds for a descent of the cover of about 10 cm.

Turning to FIG. 4, the cooling which constitutes the third step of the method, should take place while maintaining the thickness and density of the product at the close of the pressing or second step. Cooling is continued until the product has a temperature sufficiently low so that it does not swell or re-expand.

In practice it is advantageous to utilize several duplicate molds, for example, three. These are moved in succession to the respective locations for filling with pellets, as in FIG. 1, for reheating by air, as in FIG. 2, for pressing as in FIG. 3, and for cooling as in FIG. 4. Thus any given charge or quantity of pellets is treated in one and the same mold throughout the method.

Referring to FIGS. 2, 3 and 4, it is noted that mold 1 is equipped with a number of projections 4 secured to its rim portion and projecting upwardly therefrom. These projections or lugs have inwardly directed latch means 8 which, in a way clear from FIGS. 3 and 4, snap over the rim of cover 6 and hold it in the final position to which it is forced by press plunger 51, for the final or third step of cooling. Of course the molds are reusable and may be repeatedly filled with beads or pellets, for reheating.

FIGS. 5 through 8 show a machine for carrying out the method in a continuous manner.

Pellets of polystyrene are deposited into a hopper 9. These pellets may be as taught in the first of my aforesaid two patents, above identified. The hopper may be located after the crushing means disclosed in the patent, with a storage bin between them.

The pellets are fed by the hopper to one or more power-driven feed screws by which they are impelled horizontally onto the upper pass of the lowermost one 17 of two conveyor belts formed of interconnected metal links. The second belt is identified at 18. The belts are power driven so that the material fed to them by screw or screws 10, fills the space between their contiguous passes. The rate of feed is so correlated with the speed of the belts as to exert a moderate degree of compression upon the material and thus assure that there are no voids in the space between passes. During the first part of their travel with and between the belts, the pellets are reheated by air introduced into the lower portion 11 of a housing or casing enclosing the belts. The heated air passes upwardly through the material and belts as they traverse a first compartment 14. Within a second and adjacent compartment 15 the heated air is directed downwardly through the layer of material. A third compartment 16 has a shorter dimension in the direction of travel of the material. The three compartments are defined by spaced baffles or partitions 13, 13a, each comprising a lower plate and a coplanar upper plate, each having an edge closely adjacent a respective one of the belts.

The conveyors 17 and 18 limit the thickness of the layer of material created thereby, and by their open construction permit proper circulation of heated air. The resultant heating of the material, as previously described, effects a slight agglomeration of the pellets. The two contiguous passes of belts 17, 18 may be parallel, as shown, or, alternatively, may be slightly inclined toward one another in their direction of travel. When inclined, the belts effect a slight reduction in thickness of the layer of agglomerated pellets as they progress toward the delivery end of the belts, and a slight compression of the material with consequent reduction of the interstitial spaces thereof. While I have shown but one pair of conveyor belts 17, 18, in the model illustrated, it will be understood that the heating step may be carried out by two or more pairs of belts passing the material in succession.

It is contemplated that a suitable degree of suction may be used in the feeding system to create a flow of air downwardly and thus facilitate the efficient flow and placement of the pellets to and within hopper 9.

The increasing agglomeration effected by and between belts 17, 18, has the effect of reducing the flow of heated air through the material as it approaches the delivery end of the belts. For this reason, the flow of heated air in compartment 16, is directed inwardly toward both conveyor belts in order to maintain them at the desired temperature. This is illustrated in FIG. 5, by the arrows over and below the belt portions in compartment 16.

On emerging from between belts 17, 18, the pellets are in the form of a band or ribbon and have cohesion sufficient to enable them to be transferred to the second stage of the apparatus where the compression forming the second step is effected. As clearly shown upon FIGS. 5 and 6, the second step is carried out by and between two conveyor belts 20 and 21 so positioned with respect to belts 17, 18 that the material passes in a straight line directly from the first to the second pair. Belts 20, 21 are heavily build and so constructed and supported that they are able to exert upon the cohesive layer or ribbon of agglomerated pellets, a high pressure of the order of 4 metric tons/m². For example, these belts may comprise interpivoted metal plates with rigid backing plates, rollers, or supports. In carrying out this second step, belts 20, 21 are located respectively within lower and upper compartments 22, 23 which in their upstream portions are traversed by heated air. The downstream portions of these compartments contain walls or baffles which form two discrete lower and upper chambers 24 and 25, below and above the belts and including as shown, crimped or corrugated walls parallel with and contiguous to the downstream portions of the respective belts. Cooling air is circulated in and through these chambers, to cool the material. Alternatively, cooling may be effected by a spray of a cooling liquid. Thus as the band or ribbon of material advances with and between belts 20, 21, it is compressed while the temperature of the two surfaces of the band is slightly elevated above that of the interior thereof, to effect a densification of the surface layers. The surfaces of the band are thereby smoothed. The reduced thickness is maintained by the belts during the third step of final cooling of the ribbon.

While transfer of the ribbon from the heating to the compression stage, that is, from belts 17, 18 to belts 20, 21, may be made directly and without intermediate support, it is also contemplated that small rollers such as 26, 27, lower and upper, FIG. 5, may be provided to limit or prevent transverse expansion of the material as it emerges from between belts 17, 18. Likewise rollers, belts, or other suitable mechanism not shown, moving on or about vertical axes, may be provided at each side edge of the band as it emerges from the belts, to engage the edges and thus prevent lateral expansion. During the transfer between pairs of belts the material is in a semi-plastic state and this greatly facilitates the smoothing and truing of the edges of the band, thereby enabling the production of accurate sheets or panels after the band emerges from the compression and cooling stages. Furthermore, by raising the temperature of the two surfaces of the band just prior to its transfer from one pair of belts to the other, it is possible to smooth these surfaces and to create a surface density somewhat greater than that of the interior layers.

Compression of the band is effected by and between conveyors 20, 21. The contiguous effective courses or passes of these are parallel and maintain constant the reduced thickness of the band during cooling thereof. This cooling takes place immediately after the band leaves the compression stage. The spacing of the effective contiguous passes of belts or conveyors 17, 18, and 20, 21, is so selected that the completed ribbon or band emerging at 19a, FIG. 5, has a density of from 0.4 to 0.6, preferably about 0.5, with respect to the apparent density of the pellets as they enter between conveyors 17, 18.

It is noted that the heated air directed into the compartments 22, 23 at the upstream end of the compression housing, FIG. 5, does not pass through the ribbon of material but merely impinges upon the portions of belts 20, 21 instantaneously traversing this end, the purpose being to reheat them to proper temperature. It is also contemplated that this reheating may be effected by radiation. Such a modification is shown in the detail view of FIG. 5a, where elements 43, 43a represent heat radiators located closely adjacent the respective conveyors as they pass about their guide rollers at the entrance to the compression stage. The conveyors are thus heated at the instant they pass into contact with the oncoming ribbon as it emerges from the heating step or zone. This superficial heating permits to facilitate the ulterior heating by avoiding an important loss of heat and a loss of time for obtaining the cooling of the conveyors. Furthermore, the slight elevation of temperature within and during the compression stage, results in a smoothing of the surfaces of the product and increases the surface density thereof as compared with the intermediate layers.

As the ribbon emerges from the cooling stage it is received by and between pairs of vertically spaced horizontal rollers 44, by which it is maintained at the same thickness that it has upon emerging, so that reexpansion or increase in thickness are prevented. Means not shown are provided to accurately regulate and maintain correct temperatures at every stage or step of production.

FIG. 6 shows in perspective the apparatus of FIG. 5, and illustrates clearly the blowers and conduits by which the circulation of heated and cooled air is effected. At 28 is identified a burner which directs a flame into heat exchange casing 29 and from which heated air is drawn by blower 30. The output from this blower is divided into four branches generally identified at 31. One branch 31a delivers air to compartment 14. From FIG. 5 in particular, it is seen that the outlet from this branch is positioned at a level between the passes of conveyor 17 in compartment 14. This air is exhausted from compartment 14 by conduit 32, at a level between the passes of conveyor 18 therein.

A second branch 31b delivers air from blower 30 into compartment 15, at a level which, as shown upon FIG. 5, is between the passes of conveyor 18 therein. This air is exhausted from compartment 15 by conduit 32a at a level between the passes of conveyor 17 therein. Two other supply branches 31c and 31d deliver hot air from the blower into compartment 16, at vertically spaced levels between the passes of belts 18 and 17, respectively, therein. See also FIG. 5. This air escapes horizontally, most of it passing to compartment 15 and a small portion escaping to ambient air.

A second burner 33 directs hot gas to the interior of heat exchange casing 39, to heat surfaces therein over which air is drawn by blower 34. From this blower the air is delivered by conduits 35 into compartments 22 and 23. Thus, a first outlet 35a, FIG. 5, delivers air into compartment 23 at the upstream end of and above the upper pass of conveyor 21. This air passes horizontally downstream where it is exhausted at 36a for return to the blower through conduit 36. A second outlet 35b delivers heated air into compartment 22 at a level below the lower pass of conveyor 20. The air passes horizontally along and below the lower pass of this conveyor and is exhausted at 36b for return to the blower. Third and fourth outlets 36c and 36d, FIG. 5, direct streams of heated air into compartments 22 and 23, respectively, between the passes of conveyors 20, 21. As indicated by the arrows, air from outlet 36c passes downwardly through the lower pass of conveyor 20 and mingles with air being exhausted from inlet 36b. Likewise, air from inlet 36d passes upwardly through the upper pass of conveyor 21 and mingles with air being exhausted from outlet 36a.

Cooling air is drawn in by blower 37, FIG. 6, impelled through ducts 38 into chambers 24 and 25. As seen upon FIG. 5, these ducts have three outlets 38a opening into chamber 25 and regularly spaced therein in the direction of travel of the band, and three outlets 38b opening into chamber 24 and similarly spaced. Thereby a uniform distribution of cooling air is effected over the corrugated walls of the chambers, by which heat is extracted from the band passing between them. This air may be recirculated to cooling coils, or allowed to escape from the chambers through orifices therein.

Figure 8:
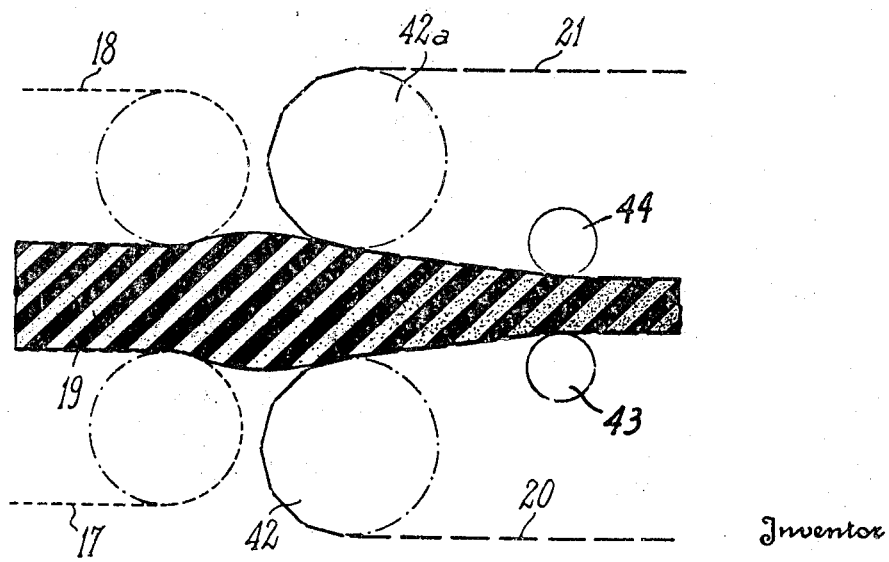
FIG. 8 shows schematically a modified form of the construction depicted upon FIG. 7.

At FIG. 7 there is shown a construction by which the length of the band passing between the heating and compression zones may be limited to a minimum. As shown, two auxiliary rollers 40, 40a of relatively small diameters, are journaled closely adjacent end rollers 42, 42a, respectively, of conveyors 20, 21. Conveyor belt 17 passes to large roller 41, thence to and about smaller roller 40. Similarly, conveyor belt 18 passes to large roller 41a, thence about smaller roller 40a. The distance traveled by band 19 between its emergence from between belts 17, 18, until its enters between 20, 21, is therefore short. As the band enters between belts 20, 21 it undergoes compression between points A and B, where its thickness is greatly reduced.

Where the speed of the conveyors is relatively high, such that compression between points A and B would be at too high a rate, or too violent, the arrangement of FIG. 8 is useful. Here, end rollers 42, 42a of belts 20, 21, are quite widely separated. From roller 42 belt 20 passes upwardly and forwardly to a small idler 43. Similarly belt 21 after passing about end roller 42a, passes downwardly and forwardly to and about a small idler 44. These two idlers are spaced apart by substantially the desired thickness of the finished product. Since they are located downstream from roller pair 42, 42a, there is a smooth and gradual compression of the band and reduction of its thickness to the desired dimension takes place gradually.

In general, the linear speeds of the two pairs of conveyors are approximately the same because of the compression and increased density effected upon the band by and between belts 20, 21. However, these belt pairs are driven by means which enable change in their relative speeds and thus provide a degree of control over the density of the finished product, while permitting an attenuation which facilitates the passage from one pair of conveyors to the other.

As an example, in fabricating panels of 1 m. width and 40 mm. thickness, from polystyrene pellets of about 4 kg/m3 density, by the apparatus of FIGS. 5 and 6, using a conveyor speed of about 6 m/min., the duration of the steps are about as follows: heating—30 sec., compression — 10 sec., cooling — 3 minutes. Thus the heating section will have a length of 3 to 4 meters, and the compression and cooling section, a length of 15 to 20 meters, of which the compression section comprising belts 20, 21 will subtend about 0.6 m. and the remainder of these belts will constitute a cooling section subtended by chambers 24, 25.

While I have disclosed the method and apparatus as presently preferred by me, various changes of shape, form, relations and dimensions of parts and elements, and substitutions of equivalents will become clear to those skilled in the art, after a study of the foregoing description. Hence the disclosure should be taken in an illustrative rather than a limiting sense, and all changes within the scope of the subjoined claims are reserved.

Having fully disclosed the invention, what I claim and desire to secure by Letters Patent of the United States is:

1. The method of agglomerating pellets of expanded polystyrene into desired shape and form, comprising, heating the pellets to uniform softening temperature under essentially atmospheric pressure, compressing the heated pellets into desired shape and form, without substantial addition of heat, and cooling the cohered pellets while maintained in said shape and form, under compression.

2. The method of agglomerating pellets of expanded polystyrene into desired shape and form, comprising, heating the pellets to uniform softening temperature under essentially atmospheric pressure, compressing the heated pellets into desired shape and form, without substantial addition of heat, and cooling the cohered pellets while maintained in said shape and form, under compression, said heating being effected by blowing gas at about 100° to 130° C. through the mass of pellets, for a period of about 10 seconds to 3 minutes, said compression being effected at a pressure of about 0.5 to 4 metric tons/m$^2$.

3. The method of claim 2, said cooling being continued under pressure, until the agglomerated pellets have a temperature sufficiently low to maintain their agglomerated form without expansion under atmospheric pressure.

4. The method of claim 2, said heating period being inversely proportional to the temperature, within the range selected.

5. Process for the continuous manufacture of panels, slabs and the like, of cohered synthetic resin cellular material such as polystyrene foam, from pearls thereof previously expanded, comprising:
   a. In a first zone forming the expanded contacting pearls into a layer and heating them to softening temperature under essentially atmospheric pressure;
   b. Moving the layer to a second zone and there subjecting the same to compression above atmospheric, to impart thereto reduced thickness and definitive density; and
   c. Moving the compressed layer to a third and cooling zone and cooling the same while subjecting it to continued pressure sufficient to maintain said reduced thickness.

6. Apparatus for forming pellets of expanded thermoplastic into predetermined agglomerated shape, comprising, housing means, a first conveyor including a first pair of foraminous belts in said housing means, and having substantially parallel coextensive adjacent first passes spaced a first distance, means for circulating heated gas into said housing means, through said belts and material confined between said first passes thereof, a second conveyor in said housing means and including a second pair of foraminous belts having substantially parallel coextensive adjacent second passes spaced a second distance less than said first distance, and positioned to receive material directly from said first passes, cooling means mounted contiguous to said second passes over and along the downstream ends thereof, and means operable to feed material to and between said first passes at the upstream ends thereof.

7. The apparatus of claim 6, and means in said housing means, for heating said second pair of belts at and along the upstream ends of said passes thereof, and upstream of said cooling means.

8. The apparatus of claim 7, partition means in said housing means, defining first, second, and third discrete compartments along and encompassing said first passes, upstream to downstream, said means for circulating heated gas directing the same upwardly through said passes traversing said first compartment, downwardly through said passes traversing said second compartment, and directly into contact with each respective pass traversing said third compartment.

9. The apparatus of claim 7, said cooling means comprising first and second chambers each having a heat exchange surface contiguous, parallel with, and substantially coextensive with the respective downstream ends of said second passes, and means circulating coolant into and through said chambers.

10. The apparatus of claim 6, said distance between said second passes slightly decreasing in the downstream direction of movement thereof.

11. The apparatus of claim 7, said heating means for said second pair of belts comprising a pair of radiant heaters each conforming to and closely adjacent the return curvature of a respective belt at the upstream ends thereof.

12. The apparatus of claim 6, said housing means comprising a first casing enclosing said first pair of belts, a second casing enclosing said second pair of belts, and upper and lower sets of rollers between said casings and confining material emerging from between said first passes and positively directing the same to and between said second passes, the belts of said two conveyors being drivable at the same or different linear speeds.

13. The apparatus of claim 6, said material feeding means being operable to feed material to and between said first passes, at a rate to fill the space therebetween without voids and without substantial compression of material.

14. The apparatus of claim 13, said second distance being sufficiently less than said first distance to exert a predetermined pressure upon material passed from said first passes to said second passes, when all said belts are driven at substantially the same linear speed.

15. Apparatus for the continuous production into panels, sheets, slabs and the like, of cohered synthetic resin cellular material, such as polystyrene foam, from pearls thereof previously expanded, comprising, a first pair of foraminous conveyor belts having contiguous spaced parallel runs between which the expanded pearls are introduced and translated, heating means adjacent the contiguous runs of said first pair of belts, for circulating heating fluid through the runs and the pearls being translated therebetween, a second pair of conveyor belts having contiguous runs spaced a distance less than that between the contiguous runs of said first pair of belts, and arranged to receive and translate the heated pearls from between said first pair of belts and to compress and agglomerate them to a desired thickness, means for heating the upstream portions only of the contiguous runs of said second pair of conveyor belts, and means juxtaposed with the downstream portions of the contiguous runs of said second pair of belts, for directing cooling fluid into heat exchange relation with the agglomerated pearls being translated by and between said downstream portions.

* * * * *